(12) United States Patent
Zamfir et al.

(10) Patent No.: US 12,432,432 B2
(45) Date of Patent: Sep. 30, 2025

(54) DRIVER MONITORING SYSTEM

(71) Applicant: Veoneer Sweden AB, Vargarda (SE)

(72) Inventors: Marius Zamfir, Iasi (RO); Adrian Cacu, Iasi (RO)

(73) Assignee: MAGNA ELECTRONICS SWEDEN AB, Vårgårda (SE)

( * ) Notice: Subject to any disclaimer, the term of this patent is extended or adjusted under 35 U.S.C. 154(b) by 205 days.

(21) Appl. No.: 18/250,137

(22) PCT Filed: Oct. 14, 2021

(86) PCT No.: PCT/EP2021/078517
§ 371 (c)(1),
(2) Date: Apr. 21, 2023

(87) PCT Pub. No.: WO2022/084159
PCT Pub. Date: Apr. 28, 2022

(65) Prior Publication Data
US 2024/0015380 A1 Jan. 11, 2024

(30) Foreign Application Priority Data
Oct. 22, 2020 (EP) ..................... 20203234

(51) Int. Cl.
H04N 23/54 (2023.01)
H04N 23/51 (2023.01)
H04N 23/56 (2023.01)

(52) U.S. Cl.
CPC ............ *H04N 23/54* (2023.01); *H04N 23/51* (2023.01); *H04N 23/56* (2023.01)

(58) Field of Classification Search
CPC ........ H04N 23/54; H04N 23/51; H04N 23/56; H04N 23/57; B60R 2011/0028; B60R 11/04
See application file for complete search history.

(56) References Cited

U.S. PATENT DOCUMENTS

| | | |
|---|---|---|
| 2003/0167094 A1 | 9/2003 | Nagasaka et al. |
| 2016/0233605 A1 | 8/2016 | Ramirez et al. |
| 2017/0106808 A1* | 4/2017 | Fuchs .................... H04N 23/57 |
| 2018/0222402 A1 | 8/2018 | Bingle et al. |
| 2021/0127532 A1 | 4/2021 | Persson et al. |

FOREIGN PATENT DOCUMENTS

| | | |
|---|---|---|
| EP | 1310406 A1 | 5/2003 |
| EP | 3410687 A1 | 12/2018 |

OTHER PUBLICATIONS

International Search Report and Written Opinion of PCT/EP2021/078517, mailed Feb. 25, 2022.

* cited by examiner

*Primary Examiner* — Yogesh K Aggarwal
(74) *Attorney, Agent, or Firm* — DICKINSON WRIGHT PLLC

(57) ABSTRACT

A vision module (1) for monitoring a driver (20) of vehicle (3) is provided in the monitoring system (15). A first vision module support (4) and a second vision module support (5) is provided. The first vision module supports (4, 5) has at least two slots (6, 7, 8, 9) and the second vision module support has at least two slots (6a, 7a, 8a, 9a,) for holding the vision module (4, 5) between the first and the second vision module support (4, 5) in a position defined by the slots (6, 7, 8, 9, 6a, 7a, 8a, 9a).

12 Claims, 7 Drawing Sheets

DRIVER MONITORING SYSTEM

CROSS-REFERENCE TO RELATED APPLICATIONS

This application is a 35 U.S.C. § 371 national phase of PCT International Application No. PCT/EP2021/078517, filed Oct. 14, 2021, which claims the benefit of priority under 35 U.S.C. § 119 to European Patent Application No. 20203234.8, filed Oct. 22, 2020, the contents of which are incorporated herein by reference in its entirety.

FIELD OF THE INVENTION

The invention relates to a driver monitoring system comprising a vision module for monitoring a driver of vehicle.

BACKGROUND

International patent application WO 2019/164724 A1 discloses a camera module assembly. An outer housing for the camera module includes a front shell with a window and a rear shell. The camera core includes a lens assembly, a sensor assembly, and a sensor housing. The sensor assembly is disposed within the sensor housing, and the sensor housing is fixed to the lens assembly.

International patent application WO 2018/219951 A1 relates to a camera module for a motor vehicle. The camera module is used for driver monitoring in the passenger compartment. The camera module has at least one printed circuit board and a shield for enclosing said printed circuit board. The shield comprises at least a first shielding part and a second shielding part.

U.S. patent application US 2019/208091 A1 discloses a camera module for a vehicular vision system. The camera module includes a metal front housing, a lens holder and a metal rear housing. The front housing houses a printed circuit board having an imager disposed thereat. The lens holder is attached at a front portion of the housing so that a lens assembly is optically aligned with the imager.

U.S. patent application US 2018/222402 A1 discloses a camera housing portion which has an imaging sensor at a base portion of the camera housing portion. A lens system is at a first portion of the camera housing portion. A first circuit board is provided that includes circuitry associated with the imaging sensor, which is disposed at a second circuit board that is in board-to-board electrical connection with the first circuit board. The camera housing portion and a connector portion are joined together to encase the first and second circuit boards.

In general, vision cameras are more and more applied in vehicles. They are used for scanning the environment of the vehicle and also for scanning the driver and passengers, sending data to an electronic control unit (ECU) that is processing the data and sending out warnings to the driver or acting vehicle components such as the vehicle brakes. In such a way the awareness of the driver is monitored by a driver monitoring system (DMS) based on a vision camera. The DMS often also comprises an illumination device e. g. an IR diode.

Typically, the camera is calibrated during the installation process with regards to the relative position of the imager sensor on a printed circuit board (PCB). The camera and, if provided, the illumination device is fixed to the housing of the camera module in the required position and angle. However due to the plurality of different car models, e. g. vehicles with steering on left or right side or front window shapes the position of the camera module may differ from car to car. It may also be necessary to adjust the position of the camera with respect to the driver. In order to achieve proper function, it may be necessary to install the camera inside the camera module at different angles. Usually this is achieved by a diversity of housing parts and cover parts, so that similar projects do not share the same housings and cover. This results in a diversity of housing parts, cover parts for similar projects.

SUMMARY OF THE INVENTION

It is an object of the present invention to provide a driver monitoring system having a vision module for monitoring a driver of a vehicle, wherein the cost of development, validation and manufacturing of the monitoring system is reduced.

The above object is achieved by a driver monitoring system in accordance with embodiments described herein.

According to an embodiment of the invention, the driver monitoring system for monitoring a driver has a vision module for monitoring a driver of vehicle. The monitoring system comprises a first vision module support and a second vision module support. Each of the vision module supports has at least two slots for holding the vision module between the first and the second vision module support in a position defined by the slots.

The advantage of the present invention is that the vision module can be placed between the first and second vision module support where the slots in the first and second camera support provide an opportunity to place the vision module in different positions and angles. This provides a solution for standardizing mechanical parts of the vision module without the need of redesign and revalidate concepts when a new carline is imposing a different position of the camera inside the vehicle.

According to an embodiment of the present invention, each of the slots of the first vision module support has one or more corresponding slots at the second vision module support. This allows the vision module to be positioned easily by sliding between the first and second vision module support in the corresponding slots.

In a preferred embodiment of the invention the vision module is a camera, which can be used for the monitoring the driver.

In an embodiment of the invention the driver monitoring system comprises a second vision module. The second vision module is also positioned between a first vision module support and a second vision module support. Each of the vision module supports has at least two slots for holding the second vision module between the first and the second vision module in different positions. The position thereby is defined by the slots.

This allows to apply the advantages of the flexible and standardized first vision module positioning to a second vision module.

According to an embodiment of the invention each of the slots of the first vision module support, which supports the second vision module, has one or more corresponding slots at the second vision module. This will provide flexibility in the mounting position of the first and second vision module as well.

According to a further embodiment, the second vision module is an illumination device, especially an IR diode.

According to a preferred embodiment of the invention, an illumination guiding plate is attached to the illumination device. The illumination guiding plate is attached between one slot of the first vision module support and one corresponding slot of the second vision module support.

This embodiment allows a safe positioning of the illumination device in any of the sliding positions which is given by each of the specific slots of the first illumination device support and a corresponding slot of the second illumination device support.

According to an embodiment of the invention the slots of the first vision module support and a corresponding slot of the second vision module support are shaped to hold the vision module in a determined horizontal angle to an optical axis and to a determined vertical angle to the optical axis. The determined horizontal angle may preferably have a value of −25 degree to 5 degree and the determined vertical angle may preferably have a value of −25 degree to 25 degree.

According to a preferred embodiment of the invention, the driver monitoring system comprises a first and a second vision module support. The first vision module support has a number of four slots. The second vision module support comprises four slots. For each of the slots of the first vision module a corresponding slot on the second vision module is provided. This allows the vision module supports to be used for holding the vision module in four different positions, especially in positions being different in their vertical and/or horizontal angle. This allows an easy, safe and flexible positioning of the vision module according to the actual requirement of the vehicle.

BRIEF DESCRIPTION OF THE DRAWINGS

The numerous advantages of the disclosure may be better understood by those skilled in the art by reference to the accompanying figures in which:

FIGS. 9a-d, 10a-d, 11a-d and 12a-d show a schematic view of driver monitoring system according an embodiment of the invention with different determined horizontal angles and different vertical angles.

DETAILED DESCRIPTION

Figure 1:
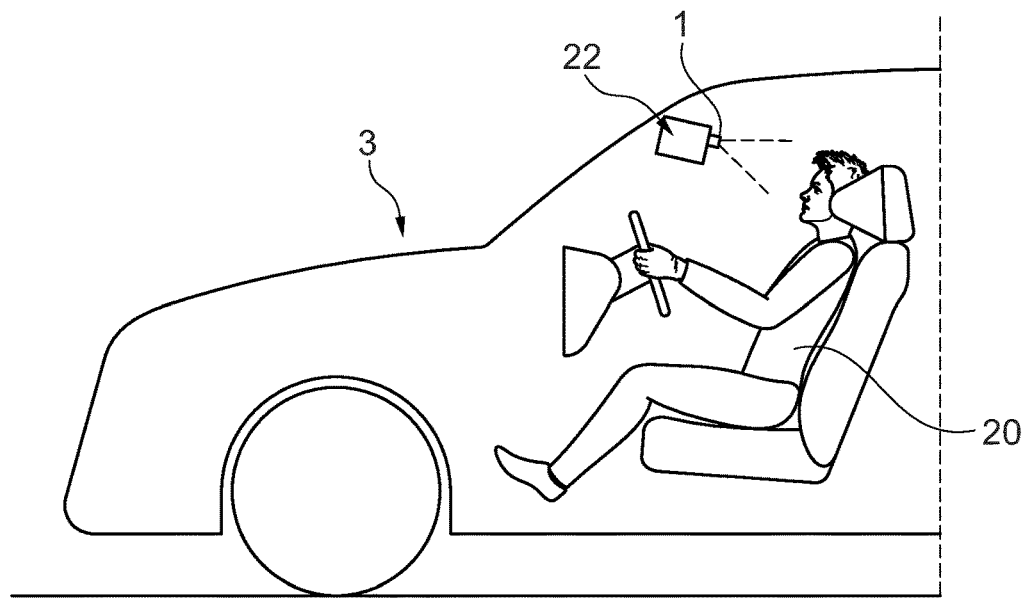
FIG. 1 is schematic representation of the placement of a driver monitoring system according an embodiment of the invention looking at the driver of the motor vehicle.

Same reference numerals refer to same elements or elements of similar function throughout the various figures. Furthermore, only reference numerals necessary for the description of the respective figure are shown in the figures. The shown embodiments represent only examples of how the invention can be carried out. This should not be construed as a limitation of the invention.

FIG. 1 shows an arrangement of driver monitoring system 22 with a vision module 1 for monitoring a driver 20 of vehicle 3. The vision module 1 can be a camera 10 (see FIG. 3). This arrangement allows to monitor the awareness of the driver 20.

Figure 2:
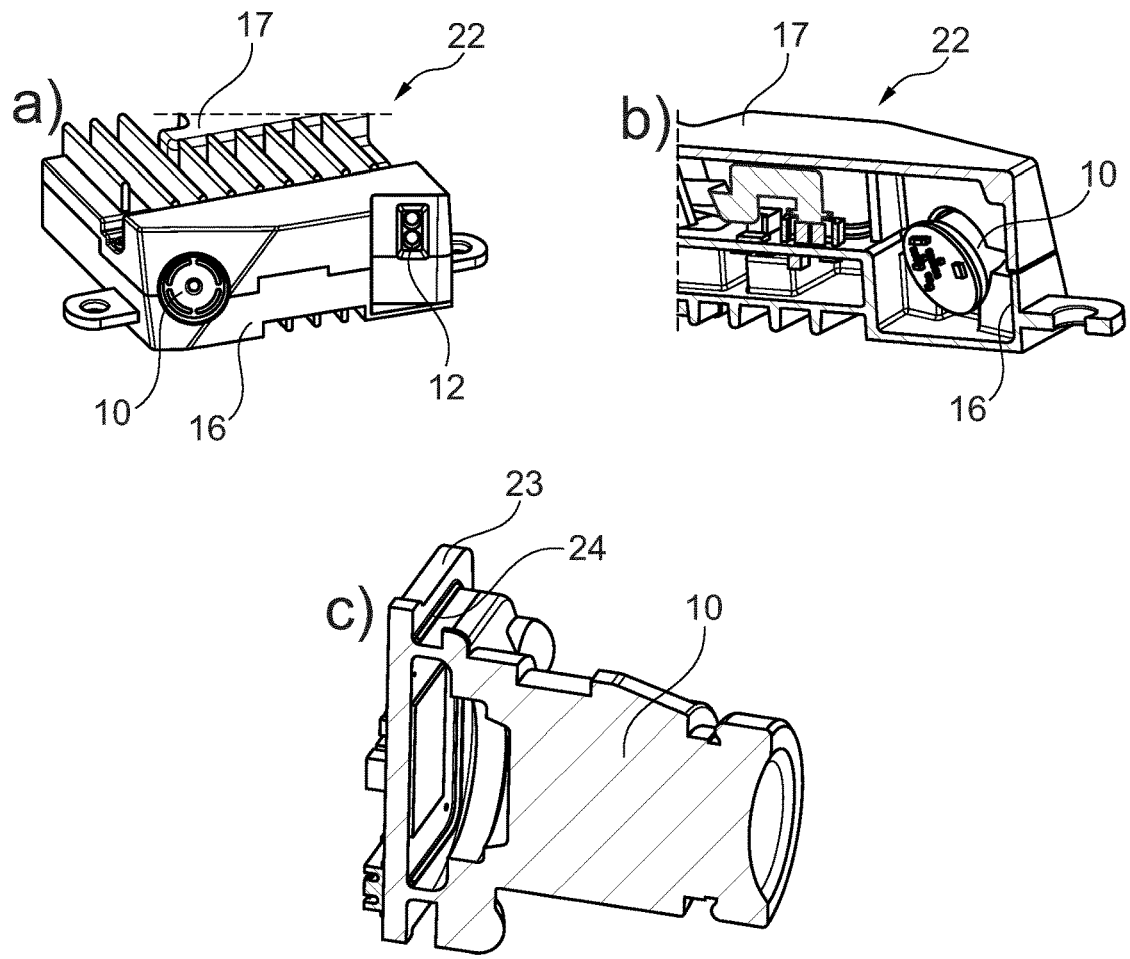
FIGS. 2a-2c show a driver monitoring system for monitoring a driver of a vehicle and vision modules according to the prior art.

FIG. 2a shows a perspective view of a driver monitoring system 22 according to the prior art. The driver monitoring system 22 comprises a cover 17 and a housing 16, where the camera 10 and an illumination device 12 is enclosed in the housing 16 and covered by the cover 17 for protection reasons.

FIG. 2b shows a perspective sectional view of monitoring system 22 according to the prior art. As the camera 10 is fixed to the housing 16 and covered by the cover 17 the final installation angle of the camera 10 is determined by the shape of the housing and the cover 17. This causes the need to develop and test new housings and covers for new car lines, especially as there may be a need to have the monitoring system 22 positioned at different locations in the car such as the steering column, the middle console or left door. This may require different angles for the camera 10, which can be achieved by a new cover and housing design.

FIG. 2c shows a camera 10 according to the prior art. The camera 10 is fixed by a fixing glue 24, which fixes the camera 10 to camera PCB 23 (printed circuit board). The camera 10 and PCB 23 may be temporarily fixed together by external fixture until glue is cured. The sub-assembly of camera 10 and PCB 23 is afterwards fixed to the housing 16 in a position and a camera angle given by the housing.

Figure 3:
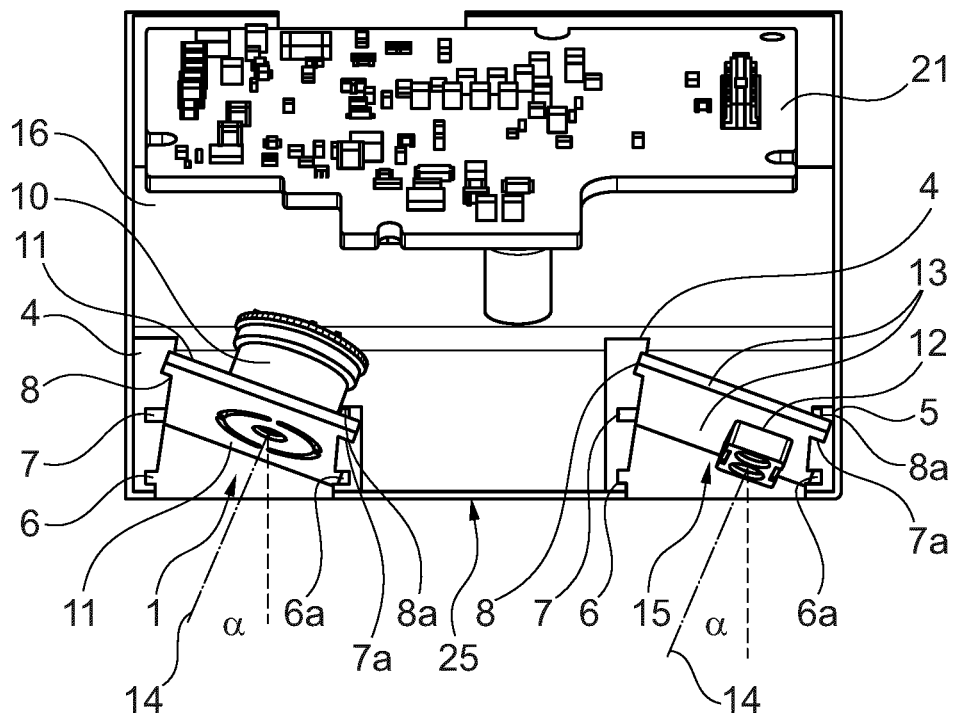
FIG. 3 is a perspective view of a driver monitoring system according to an embodiment of the invention.
Figure 4:
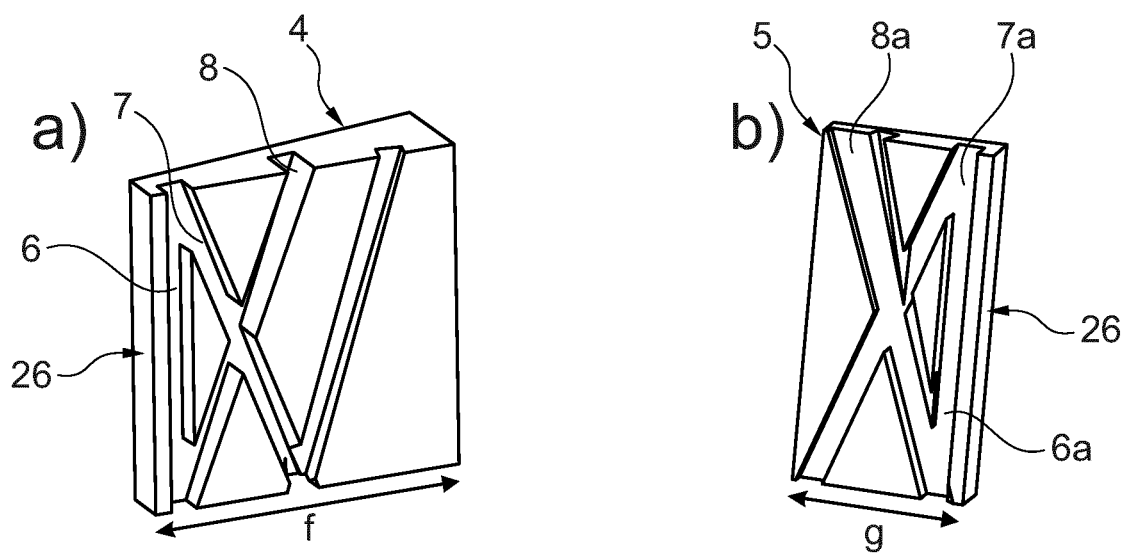
FIGS. 4a and 4b are perspective views of a first vision module support and a second vision module support according to an embodiment of the invention.

FIG. 3 is a perspective view of a driver monitoring system 22 according to an embodiment of the invention, which may also comprise a PBC 21. A housing 16 of the monitoring system 22 comprises a vision module 1 which is, for example, a camera 10. A first vision module support 4 and a second vision module support 5 is provided. The first vision module support 4 has slots 6, 7, 8, 9 (see also FIG. 4). The second vision module support 5 has slots 6a, 7a, 8a, 9a. The slots of the first and the second vision module support 6, 7, 8, 9, 6a, 7a, 8a, 9a are provided to hold the camera 10 between the first and the second vision module support 4, 5 in a position defined by the slots.

In an embodiment of the invention the vision module supports 4, 5 are arranged in the housing 16 horizontally to the window side 25 of the housing 16. In this way it is possible to arrange the camera 10 between the first and second vision module support 4, 5. The camera 10 thus can be fixed in a determined horizontal angular position represented by the angle α to the optical axis 14. The horizontal angular position is determined by slots of the first vision module 6, 7, 8, 9, and the corresponding slots of the second vision module support 6a, 7a, 8a, 9a.

In the example shown in FIG. 3 the camera 10 is held between slot 9 of the first vision module support 4 and a corresponding slot 9a of the second vision module support 5. A camera guiding plate 11 can be applied to the camera 10 to enable safe and easy sliding in the corresponding slots 6, 7, 8, 9 and 6a, 7a, 8a, 9a of the first and second vision module supports 4, 5. This also enables a safe and reliable mount of the camera 10.

As also shown in FIG. 3, in a further embodiment of the invention the driver monitoring system 22 may comprise a second vision module, which in this case is an illumination device 12, especially an IR diode, as shown. However, the second vision module may also be a second camera (not shown). To support the second vision module 15 a first vision module support 4 and a second vision module support 5 is provided. The first vision module support 4 has slots 6, 7, 8, 9 (see also FIG. 4). The second vision module support 5 has slots 6a, 7a, 8a, 9a. The slots of the first vision module support 6, 7, 8, 9 and the second vision module support 6a, 7a, 8a, 9a are provided to hold the illumination device 12 between the first and the second vision module support 4, 5 in a position defined by the slots 6, 7, 8, 9, 6a, 7a, 8a, 9a. By providing similar or substantially identical first and second vision module supports 4, 5 to the camera 10 and to illumination device 12, all the advantages and embodiments mentioned above can be applied to the second vision module 15 respectively.

FIGS. 4a and 4b are perspective views of a first vision module support 4 and a second vision module support 5 according to an embodiment of the invention. The first vision module support 4 has slots 6, 7, 8, 9. The second vision module support 5 has slots 6a, 7a, 8a, 9a. The slots of the first vision module support 4 and the slots of the second vision module support 5 do correspond to each other in pairs. For example these corresponding slot pairs can be slot 6 and 6a, slot 7 and 7a, slot 8 and 8a or 9 and 9a. The first vision module support 4 may have a length f which may differ from the length g of the second vision module support 5. The first and second vision module support 4, 5 are mounted in the housing 16 (FIG. 3) with the window surface 26 showing in the direction of the window side 25 (FIG. 3). Thus, it can be achieved that a vision module 1, 15, can be slidably mounted in corresponding slots of the first and second vision module supports 4, 5.

Figure 5:
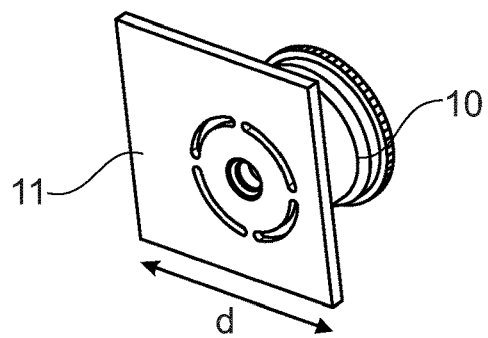
FIG. 5 is a perspective view of a camera guiding plate connected to a camera.
Figure 7:
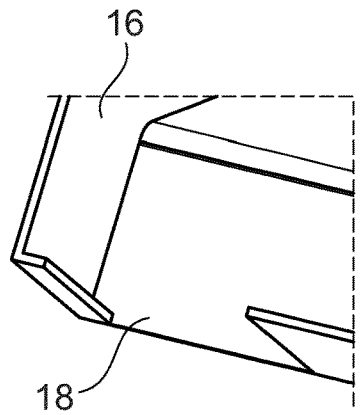
FIG. 7 is a perspective view of a window in a housing of a driver monitoring system according an embodiment of the invention.

FIG. 5 is a perspective view of a camera 10 and an illumination device 12. camera guiding plate 11 is mounted to the camera 10. The camera guiding plate 11 is mounted to the frontend of the camera 10. Preferably, the camera guiding plate 11 has a rectangular e. g. quadratic shape. With respect to the bottom length d the shape has to be adapted to the size of the window 18 (FIG. 7). The camera guiding plate 11 allows an easy sliding in the pairs of slots 6, and 6a, 7 and 7a, 8 and 8a as well as 9 and 9a of the first and second vision module support 4, 5.

Figure 6:
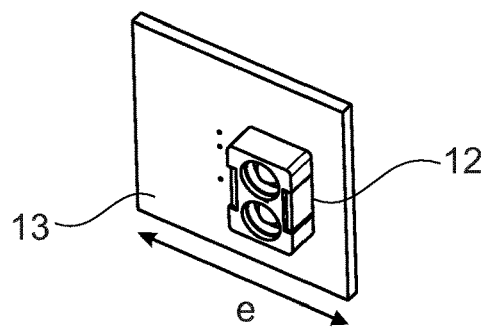
FIG. 6 is a perspective view of an illumination guiding plate connected to an illumination device.

FIG. 6 is a perspective view of an illumination guiding plate 13 connected to an illumination device 12. The illumination guiding plate 13 is mounted to the backend of the illumination device 12 and may comprise a PBC, suitable for the illumination device 12. Preferably, the illumination guiding plate 13 has a rectangular especially quadratic shape. With respect to the bottom length e the shape preferably is adapted to the size of the window 18 (FIG. 7). The illumination guiding plate 13 allows an easy sliding in the pairs of slots 6, and 6a, 7 and 7a, 8 and 8a as well as 9 and 9a of the first and second vision module support 4, 5.

FIG. 7 is a perspective view of a window 18 of the housing 16 of a driver monitoring system. The window 18 is provided for each vision module 1, 15 (FIG. 3) used in the driver monitoring system 22. For the purpose of standardization it is of a further advantage, if all windows 18, used in the housing 16 for each vision module 1, 15 are of the same size. This will also lead to a possible standardization of the bottom length d and e or even the shape of illumination guiding plate 13 and camera guiding plate 11 (FIGS. 5 and 6), which would reduce production costs.

Figure 8:
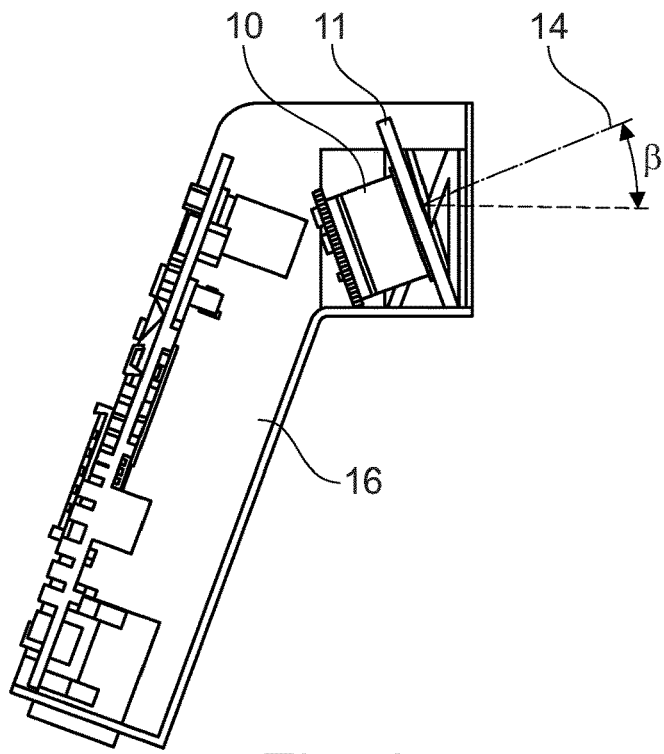
FIG. 8 is a plan view to an embodiment of a driver monitoring system.

FIG. 8 is a plan view to an embodiment of a driver monitoring system. A housing 16 comprises a camera guiding plate 11 which is connected to the camera 10. The camera 10 is mounted in corresponding slots (not shown) of a first vision module support and a second vision module support (not shown). The slots have a direction such that the camera comprises a vertical angle β to the optical axis. The present invention thus can be used to provide a variety of combinations of vertical angles β and horizontal angles α. The vertical angles β can preferably be selected from $-25 \leq \beta \geq 25$ and can especially be selected to be 0, 16, 20 or −20 degree. The horizontal angles α can be selected from $-25 \leq \alpha \geq 5$ and can especially be selected to be 0 or −20 degree.

FIGS. 9a-9d, 10a-d, 11a-d and 12a-d show embodiments of the invention with different determined horizontal angles α and different determined vertical angles β, where a camera guiding plate 11 is attached to the camera 10.

Figure 9:
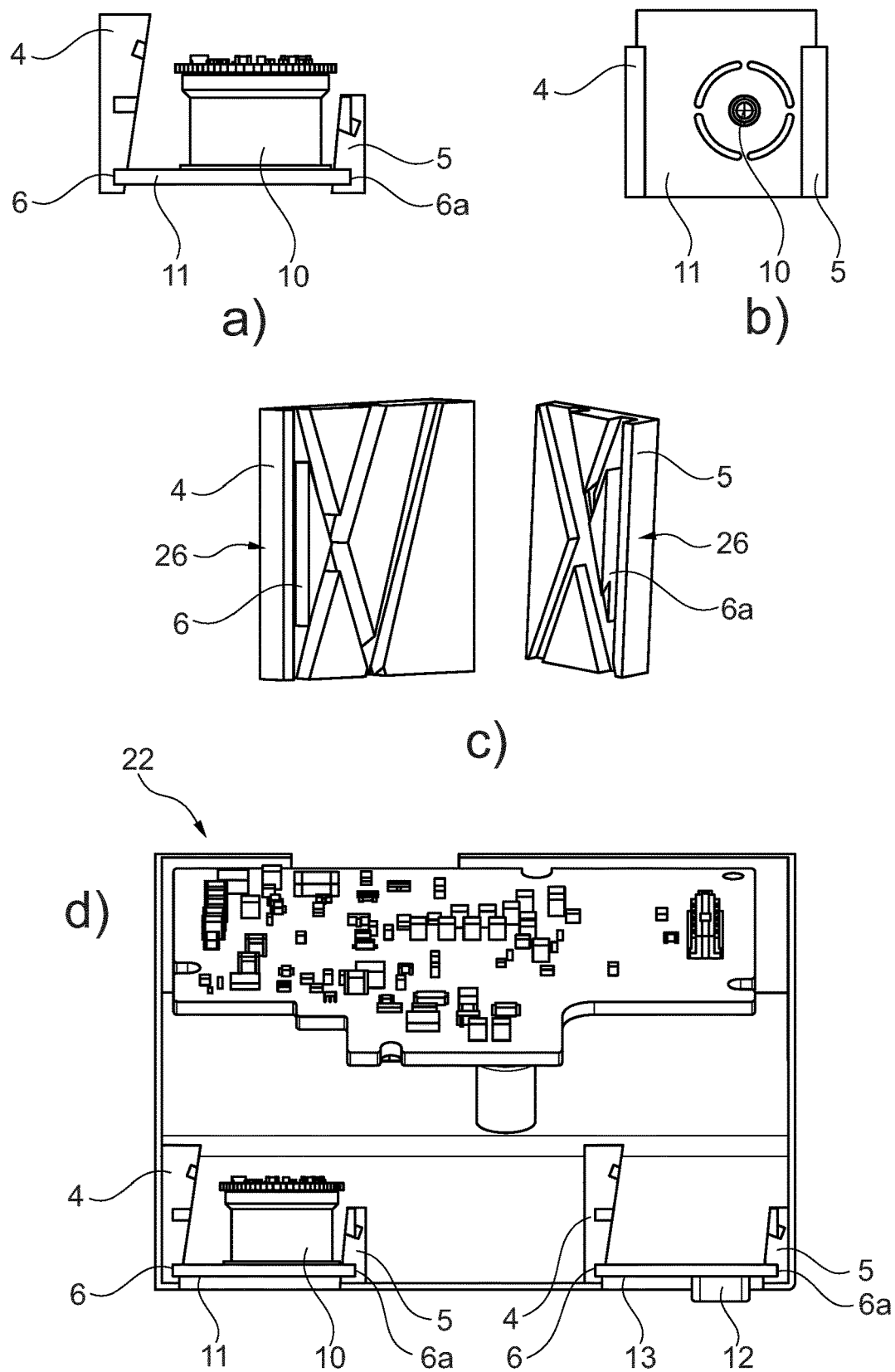
FIGS. 9 to 12 (a to d)

In FIG. 9a the camera guiding plate 11 is guided in a pair of corresponding slots, which is slot 6 of the first vision module support 4 and slot 6a of the second vision module support 5. As can be seen from FIG. 9c the slot 6 and 6a are performed parallel to the window surface 26, resulting in a determined horizontal angles α=0 degree and a determined vertical angles β=0 degree. Thus, the camera 10 is mounted parallel with the front face as shown schematically in FIG. 9b.

FIG. 9d shows a schematic view of a driver monitoring system 22 according an embodiment of the invention, where a camera guiding plate 11 is attached to a camera 10. An illumination device 12 is provided with an illumination guiding plate 13 attached. The camera guiding plate 11 and the illumination guiding plate 13 are guided in a pair of corresponding slots, which is slot 6 of the first vision module support 4 and slot 6a of the second vision module support 5. Thus, the camera 10 and the illumination device 12 are arranged in the monitoring system 22 at a determined horizontal angles α=0 degree and a determined vertical angles β=0 degree.

Figure 10:
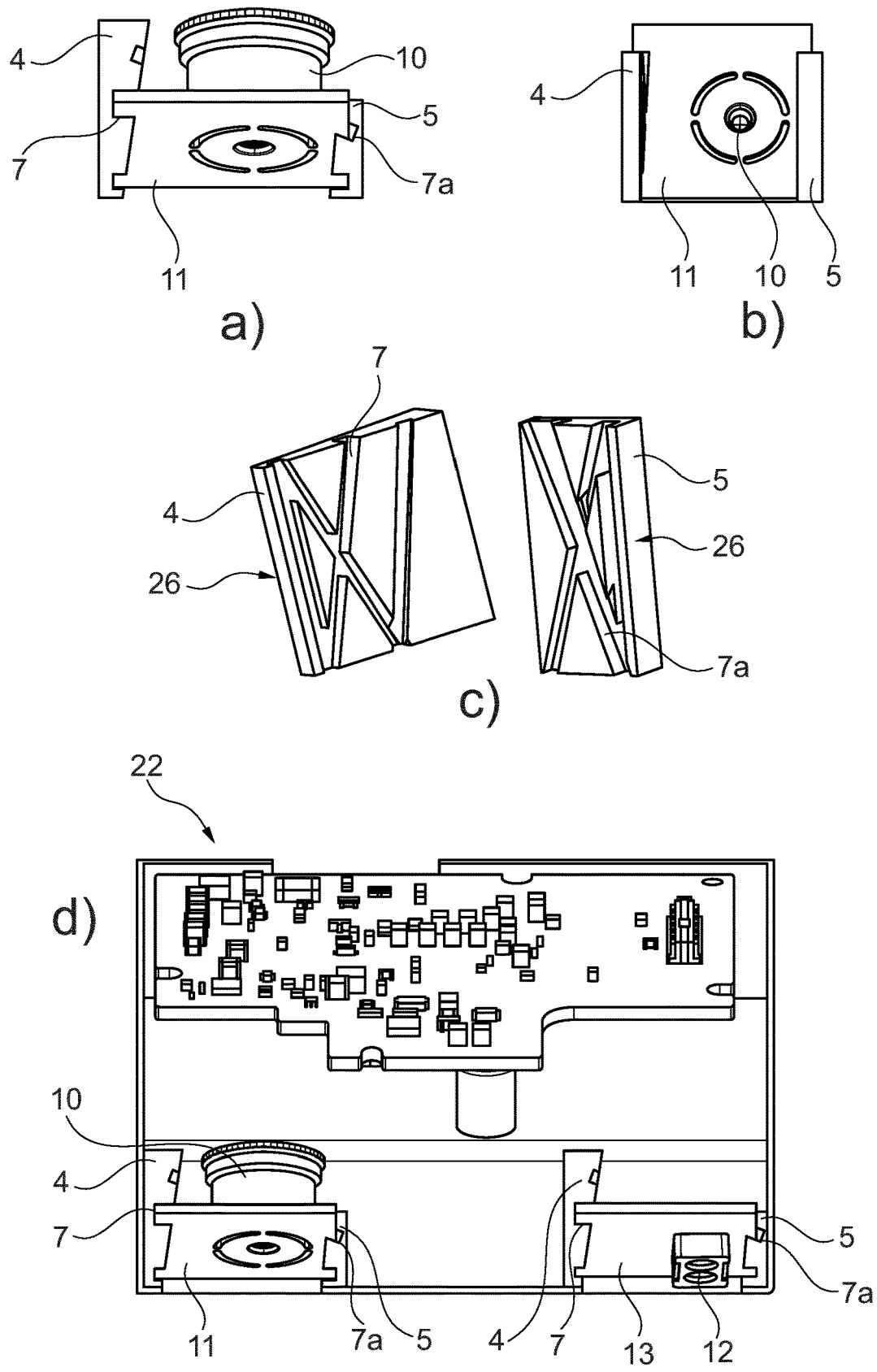

In FIG. 10a the camera guiding plate 11 is guided in a pair of corresponding slots, which is slot 7 of the first vision module support 4 and slot 7a of the second vision module support 5. As can be seen from FIG. 10c the slot 7 and 7a are sloped forward in the direction of the window surface 26 such that a determined horizontal angle α=0 degree and a determined vertical angle β=20 degree is achieved. Thus, the camera 10 is mounted sloped upwards with the front face as shown schematically in FIG. 10b.

FIG. 10d shows a schematic view of a driver monitoring system 22 according an embodiment of the invention, where a camera guiding plate 11 is attached to a camera 10. An illumination device 12 is provided with an illumination guiding plate 13 attached. The camera guiding plate 11 and the illumination guiding plate 13 are guided in a pair of corresponding slots, which is slot 7 of the first vision module support 4 and slot 7a of the second vision module support 5. Thus, the camera 10 and the illumination device 12 are arranged in the monitoring system 22 at the same determined horizontal angles α=0 degree and the determined vertical angles β=20 degree.

Figure 11:
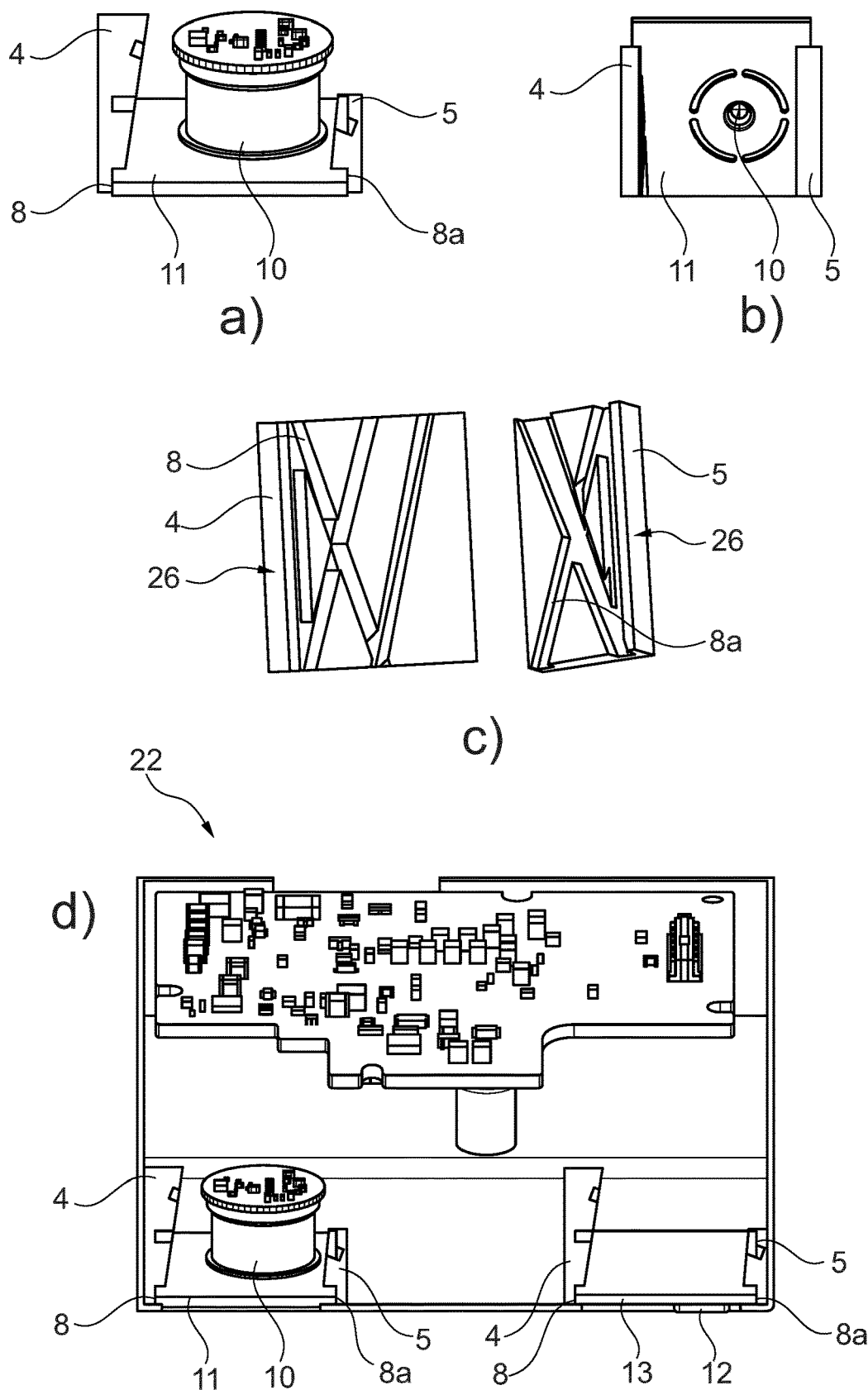

In FIG. 11a the camera guiding plate 11 is guided in a pair of corresponding slots, which is slot 8 of the first vision module support 4 and slot 8a of the second vision module support 5. As can be seen from FIG. 11c slot 8 and slot 8a are sloped backwards to the window surface 26 such that a determined horizontal angles α=0 degree and the determined vertical angles β=−20 degree is achieved. Thus, the camera is mounted sloped downwards with the front face as shown schematically in FIG. 11b.

FIG. 11d shows a schematic view of a driver monitoring system 22 according an embodiment of the invention. A camera guiding plate 11 is attached to a camera 10. An illumination device 12 is provided with an illumination guiding plate 13 attached. The camera guiding plate 11 and the illumination guiding plate 13 are guided in a pair of corresponding slots, which is slot 8 of the first vision module support 4 and slot 8a of the second vision module support 5. Thus, the camera 10 and the illumination device 12 are arranged in the monitoring system 22 at a determined horizontal angles $\alpha$=0 degree and a determined vertical angles $\beta$=−20 degree.

Figure 12:
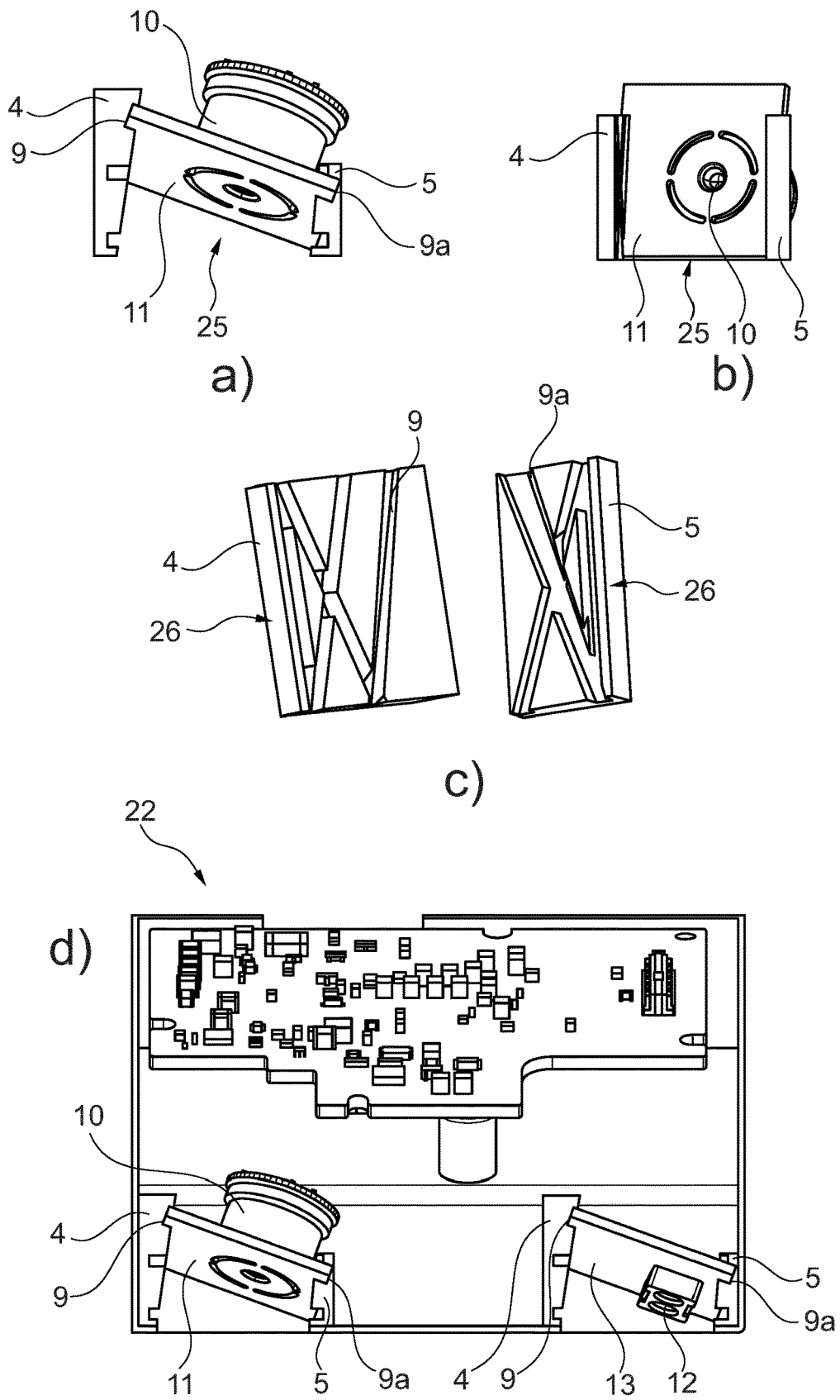

In FIG. 12a the camera guiding plate 11 is guided in a pair of corresponding slots, which is slot 9 of the first vision module support 4 and slot 9a of the second vision module support 5. As can be seen from FIG. 12c slot 9 and slot 9a are sloped forward to the window surface 26. Furthermore, the distance of slot 9a to the window side 25 is smaller than the distance of slot 9 to the window side 25 (see FIG. 3). In this way a determined horizontal angles $\alpha$=20 degree and the determined vertical angles $\beta$=16 degree is achieved. Thus, the camera 10 is mounted sloped upwards and declined with respect to the window side 25 as shown schematically in FIG. 12b.

FIG. 12d shows a schematic view of a driver monitoring system 22 according an embodiment of the invention where a camera guiding plate 11 is attached to a camera 10. An illumination device 12 is provided with an illumination guiding plate 13 attached. The camera guiding plate 11 and the illumination guiding plate 13 are guided in a pair of corresponding slots, which is slot 9 of the first vision module support 4 and slot 9a of the second vision module support 5. Thus, the camera 10 and the illumination device 12 are arranged in the monitoring system 22 at a determined horizontal angles $\alpha$=20 degree and a determined vertical angles $\beta$=16 degree.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

The invention claimed is:

1. A driver monitoring system having a vision module for monitoring a driver of a vehicle, comprising:
   - a first vision module support,
   - a second vision module support,
   - each of the first and second vision module supports having at least two slots for holding the vision module between the first and the second vision module support in a position of two or more different position options each defined by the slots, and wherein the two or more different position options are each different in at least one of a vertical angle and a horizontal angle.

2. The driver monitoring system according to claim 1, wherein each of the slots of the first vision module support has at least one corresponding slot of the second vision module support.

3. The driver monitoring system according to claim 1, further comprising a vision module guiding plate is attached to the vision module and where the vision module guiding plate is attached between one of the slots of the first vision module support and one corresponding slot of the second vision module support.

4. The driver monitoring system according to claim 1, wherein the vision module is a camera.

5. A driver monitoring system having a vision module for monitoring a driver of a vehicle comprising:
   - a first vision module support,
   - a second vision module support,
   - each of the first and second vision module supports having at least two slots for holding the vision module between the first and the second vision module support in a position defined by the slots, and
   - further comprising the vision module is a first vision module and a second vision module, a first vision module support having the at least two slots, and a second vision module support having at least two slots for holding the second vision module between the first and the second vision module support in a position defined by the slots.

6. The driver monitoring system according to claim 5, wherein each of the slots of the first vision module support has at least one corresponding slot of the second vision module support.

7. The driver monitoring system according to claim 5, wherein the second vision module is an illumination device.

8. The driver monitoring system according to claim 7, further comprising an illumination guiding plate attached to the illumination device and where the illumination guiding plate is attached between one of the slots of the first vision module support and the corresponding slot of the second vision module support.

9. The driver monitoring system according to claim 6, where the illumination guiding plate comprises a circuit board.

10. The driver monitoring system as claimed in claim 1, further comprising in that the slots of the first vision module support, and the corresponding slot of the second vision module support are shaped to hold the vision module in a determined horizontal angle ($\alpha$) to an optical axis and a determined vertical angle ($\beta$) to the optical axis.

11. The driver monitoring system as claimed in claim 10, further comprising in that the determined horizontal angle ($\alpha$) has a value of $-25 \leq \alpha \geq 5$ degrees and the determined vertical angle ($\beta$) has a value of $-25 \leq \beta \geq 25$ degrees.

12. The driver monitoring system as claimed in claim 5, further comprising in that the first vision module support comprises 4 of the slots and that the second vision module support comprises 4 of the slots.

* * * * *